April 24, 1962  R. B. DAVENPORT ET AL  3,030,790
CLOTHES WASHING MACHINE WITH WATER LEVEL CONTROL MEANS
Filed Oct. 11, 1960  3 Sheets-Sheet 2
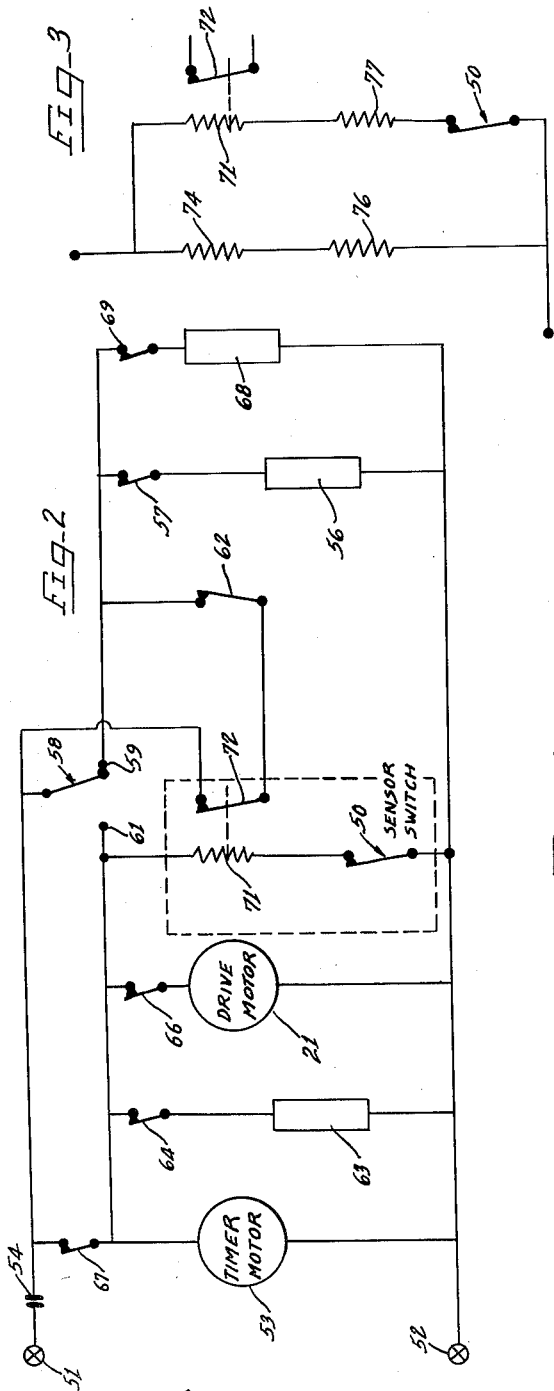
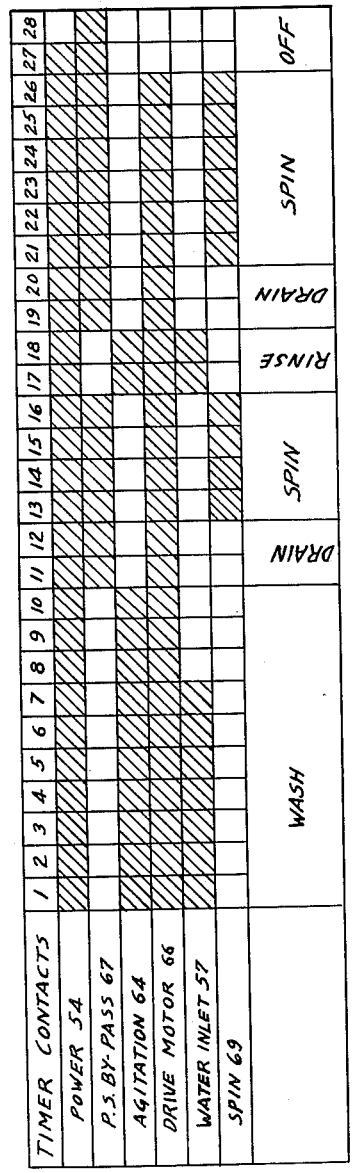
Inventor
Rodney B. Davenport
Edward J. Woodfin April 24, 1962 R. B. DAVENPORT ET AL 3,030,790
CLOTHES WASHING MACHINE WITH WATER LEVEL CONTROL MEANS
Filed Oct. 11, 1960 3 Sheets-Sheet 3

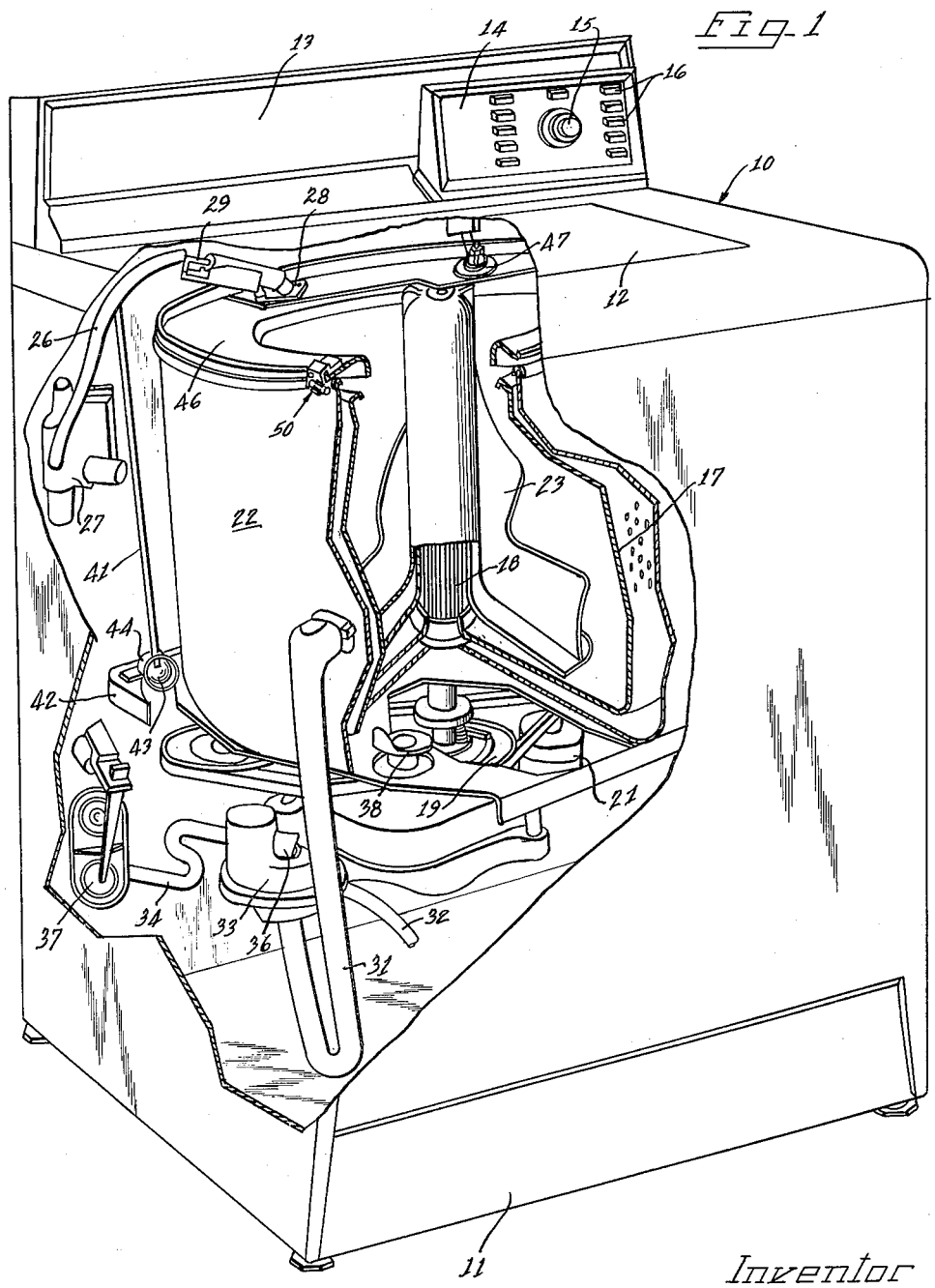

Inventor
Rodney B. Davenport
Edward J. Woodfin
by *Sill, Sherman, Meroni, Gross & Simpson* Attys.

United States Patent Office 3,030,790
Patented Apr. 24, 1962

3,030,790
CLOTHES WASHING MACHINE WITH WATER
LEVEL CONTROL MEANS
Rodney Bell Davenport, Warsaw, Ind., and Edward John
Woodfin, St. Joseph, Mich., assignors to Whirlpool Corporation, St. Joseph, Mich., a corporation of Delaware
Filed Oct. 11, 1960, Ser. No. 62,040
14 Claims. (Cl. 68—13)

This invention relates to laundry apparatus and, more specifically, to an apparatus having a torque responsive system which functions to maintain the ratio of laundry liquid to wash load at an optimum value.

One of the recent developments in laundry machines has been a torque responsive system which utilizes the torque transmitted from the agitator to the tank to energize the water control system and introduce an appropriate amount of liquid into the tank for washing purposes. A system of this type is described in the co-pending Cobb and Williams application entitled "Home Appliance" filed August 22, 1960 as Serial No. 51,226. Briefly, this system operates on the principle that the wash liquid is incapable of transmitting significant amounts of torque because water will not support shear forces. When a given load is supplied with insufficient amounts of water, torque from the agitator will be transmitted through the load to the basket and the tank. As the agitator oscillates, the torque transmitted through the load to the basket and tank produces corresponding movement of the basket and tank which is detected by the torque sensing means, normally taking the form of a mercury switch although other torque sensing devices can be used. The signal derived from this torque sensitive means then controls the fluid entry means of the laundry machine to introduce more water and thereby reduce the transmitted torque. Thus, the torque signal can be utilized to afford a highly accurate control of the optimum amount of water in the tank regardless of the load size or of the types of fabric included in the load make-up.

The washing machine of the present invention represents an improvement over the type of system described in the foregoing discussion. The system of the present invention provides an improved control system in combination with a torque sensing means to introduce small increments of liquid into the load as required for best washing results commensurate with a particular load size. In a preferred embodiment of the invention, the control system which cooperates with the torque sensing means is rendered substantially independent of fluctuations in the line voltage and fluctuations in the ambient temperature.

The improved control system of the present invention is preferably combined with a maximum and minimum water level switch of the type commonly employed in automatic machines. The minimum water level switch assures that a load will not be agitated within the basket when there is an entire absence of water in the tub, and thus serves as a safety device. The maximum water level switch limits the amount of water to a predetermined safe level so that extra heavy clothes will not introduce more water into the machine than the machine can hold.

In the improved control system of the present invention, there is provided an electrically energized heater in series with the torque sensing switch and a switch responsive to the temperature of the heater to control the introduction of liquid into the tank. In an improved version of this basic combination, the switch which controls the fluid control means is made responsive to the temperature of two heaters, one of which tends to keep the switch from being actuated prematurely by increases in line voltage. Further control over the level of wash liquid introduced into the tank is provided, in the present invention, by an improved pre-setting adjusting device which controls the sensitivity of operation of the torque sensing means.

A further object of the invention is to provide a washing machine of the type described with improved circuitry to render the flow control means of the washing machine responsive to changes in torque existing between the agitator and the tank.

A still further object of the present invention is to provide an improved torque sensing system, and allied circuits, which substantially compensate for variables such as ambient temperature changes and fluctuations in line voltage.

Other objects and advantages of the invention will become apparent as the description proceeds in accordance with the drawings in which:

In the drawings:

FIGURE 1 is a view in perspective of a washing machine with which the control assembly of the present invention may be advantageously employed, and which is broken away to afford a view of the operating parts thereof;

FIGURE 2 is a circuit diagram of one control system which may be employed in accordance with the present invention;

FIGURE 3 is a modified form of the invention which may be substituted for part of the circuit illustrated in FIGURE 2;

FIGURE 4 is a timer schedule illustrating the manner in which the various contacts indicated in FIGURE 2 are sequentially closed during the various operations of the washing machine;

As shown on the drawings:

Figure 5:
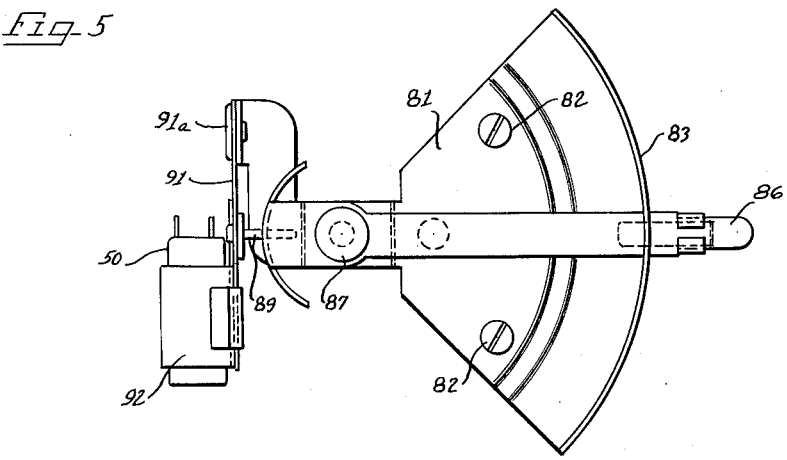
FIGURE 5 is a plan view of a suitable control assembly for pre-positioning the torque sensing means employed in the device.
Figure 6:
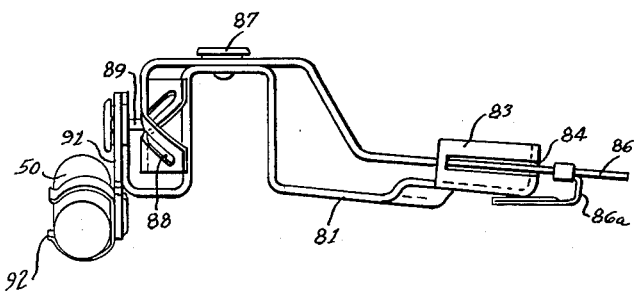
FIGURE 6 is a view in elevation of the control assembly of FIGURE 5.
Figure 7:
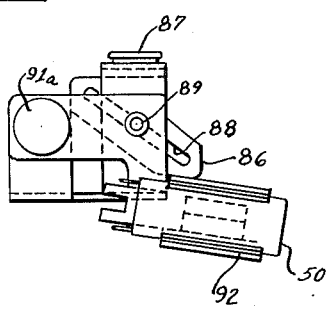
FIGURE 7 is a front elevational view of the control assembly.
Figure 8:
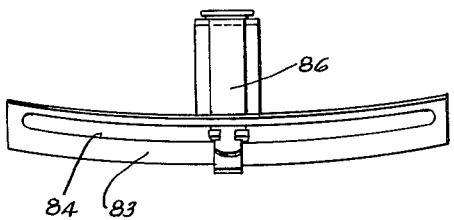
FIGURE 8 is a view of the adjusting slide of the control assembly.

While it will be recognized that the system of the present invention is applicable to various types of washing machines employing, for example, various types of agitators, the particular machine illustrated in the drawings utilizes an oscillatory type agitator mounted on a vertical axis. In FIGURE 1, reference numeral 10 indicates generally the entire washing machine including a cabinet 11 provided with a lid 12 and a back 13 on which is mounted a control panel 14 including a control knob 15 and control buttons 16 for operating the machine automatically through a programmed schedule of washing, rinsing, and extracting periods.

A foraminous basket 17 is mounted on a spin tube 18 and is driven at an extraction or spin speed by drive motor 21 as controlled by a drive and brake mechanism 19. The basket 17 is mounted in an outer tub or tank 22 and clothes contained within the machine are agitated by an agitator 23. Liquid is delivered into the machine by means of a hose 26 which communicates with a mixing valve 27 and a water inlet 28 for introducing water into the basket. If desired, an air gap vacuum break 29 may also be provided. The machine 10 is provided with a unidirectional pump 33 consisting of a separate lower recirculation portion and a separate upper pump out and suds return portion. Both pump portions operate whenever the drive motor 21 is energized. Whenever there is water in the tub 22 and the drive motor 21 is energized, the recirculation portion serves to discharge water from the tub 22 through the hose 31 and into the hose 32. The hose 32 is connected to a filter (not shown) that discharges filtered water back into the tub 22. An agitation solenoid 63 (FIGURE 2), in addition to controlling the mechanical movement of the agitator 23, also controls the direction of water flow through hose 34 leading from the pump 33 to a two-way valve 37 and the hose 36 leading from the pump 33 to the outlet 38 in the tub 22. The two-way valve 37 is provided to control a suds saving and return feature. If this suds saving feature is not desired, the two-way valve 37 is eliminated and the hose 34 is connected directly to drain. During the wash cycle the agitation solenoid 63 is energized and the pump is conditioned to pump in the direction from hose 34 to hose 36 and thus acts to hold the water in the tub. At the end of the wash cycle, the agitation solenoid 63 is de-energized and the pump is conditioned to withdraw water from the tub 22 through outlet 38, through hose 36 to hose 34, and to the two-way valve 37, if used.

In the form of the invention shown in FIGURE 1, the tub 22 is mounted by means of a three-point ball and rod suspension system, a rod 41 being pivotally connected to a base plate 42 for the tub by means of a ball 43 located in socket 44.

The tub or tank 22 is formed with a rim 46 extending radially inwardly and downwardly over the basket 17, and in a preferred form of the invention, a snubber 47 is attached to the cabinet 11 and presses down on the rim or tub ring 46 to dampen the oscillations produced during operation of the machine as hereinafter described. When such a snubber is utilized, the suspended operating system will tend to rotate around a pivot point provided by the snubber 47 as a result of the torque transmitted from the agitator 23 to the suspended system, since the snubber is the only semi-stationary point of the suspended system.

The torque sensing means with its adjusting means is generally illustrated at numeral 50 in FIGURE 1 and will be described more completely in a succeeding portion of this description and is shown in more detail in FIGURES 5 through 8. For the present purposes, it is sufficient to say that the torque sensing means 50 includes pneumatic, or electrical sensing means such as a conventional mercury switch which is capable of being actuated upon a predetermined torque transmitted from the agitator 23 to the tank 22. For purposes of best control, it is advisable to position the torque sensing means 50 as far from the stationary pivot point 47 as possible, as location of the sensing means closer to the snubber 47 results in reduced torque signals.

Operation of the sensing system and its allied circuits can best be described in conjunction with the diagrams forming FIGURES 2 to 4 of the drawings. In FIGURE 2, reference numerals 51 and 52 represent the two sides of the power source which is used to energize the assembly. The various cycle portions are programmed through the operation of a timer motor 53 having a series of cams (not shown) which operate the various timer switch contacts identified in the circuit diagrams. Timer contact 54 applies the power to the various energizing circuits throughout the complete cycle. Water is introduced into the tub of the machine by the operation of a water inlet solenoid 56 controlled by a timer contact 57.

A minimum or low level pressure switch 58 is arranged to move between a pair of contacts 59 and 61, the contact 59 representing the empty position, the contact 61 being engaged when the liquid level in the tank reaches a predetermined low level.

The maximum level of water in the tank is determined by the operation of a maximum or high level pressure switch 62 to restrict the level of the liquid in the tank to a predetermined maximum.

The agitator 23 is controlled through the operation of an agitation control solenoid 63 which is in series with a timer contact 64. The drive motor 21 is energized through another timer contact 66.

When the circuit is first energized, the low level pressure switch 58, now engaging the contact 59, permits energization of the water inlet solenoid 56 through timer contact 57, and water enters the machine and eventually causes the low level pressure switch 58 to move from the position shown in FIGURE 2 into contact with the contact 61. The action of the switch 58 thereupon energizes the timer motor 53, the agitation control solenoid 63 through timer contact 64 and the drive motor 21 through timer contact 66. The normal washing cycle then begins, and water is introduced into the tank automatically, as subsequently explained in detail, until such time as the level of the water is sufficient for the load being washed. The timer motor 53, through its cam contacts completes the wash portion of the sequence by instituting a drain cycle for a period of about two minutes, as illustrated in FIGURE 4. At the beginning of the drain cycle, the low level water switch by-pass contact 67 closes to energize timer motor 53 independently of the low level water switch and the timer contact 64 opens to de-energize the agitation solenoid 63. As mentioned earlier, the pump 33 is conditioned to pump water from the tub to drain through the hoses 36 and 34 when the agitation solenoid 63 is de-energized.

After the completion of the drain cycle, a first spinning cycle occurs in which a spin control solenoid 68 is energized through a contact 69 on the timer motor and contact 59 of the low level control switch 58. This is followed by a rinse cycle with the circuits of FIGURE 2 functioning as explained for the wash portion of the total sequence.

The rinsing cycle is followed by a second drain cycle in which the agitation control solenoid 63 is deenergized by the opening of the contact 64 allowing the machine to again be pumped out by pump 33.

The following cycle is another spin cycle in which the spin solenoid 68 is energized as stated for the first spin cycle. Finally, the assembly is completely deenergized by operation of the timer motor contact 54.

The torque responsive switch 50, as illustrated in FIGURE 2, may take the form of a normally closed switch which is in series with an electrically energized heater 71. During the washing cycle (after switch 58 moves from contact 59 to contact 61), if the minimum amount of water provided by the low level pressure switch 58 is adequate for the load being washed, there will not be enough torque transmitted from the agitator 23 through the load to the sensor switch 50. The switch 50 will then remain closed, thus allowing the heater to be continuously energized during which time water continues to enter the machine. The heater 71 actuates a heat responsive or heat accumulator switch 72, in series with water inlet solenoid 56, which is preferably also of the normally closed variety. It is desirable to have switch 72 open up after approximately 15 seconds of continuous energization of the heater 71. After this heating interval, the switch 72 opens and breaks the circuit to the water inlet solenoid 56 through the high level pressure switch 62. The combination of the heater 71 and the switch 72 form a time delay. However, if the minimum water level switch 58 did not provide an adequate amount of water for the load being washed, the torque transmitted from the agitator through the load to the sensor switch 50 will cause it to intermittently open and close in phase with the movement of the agitator 23. This action causes the heater 71 to be intermittently energized until enough water has been added to the load whereby sensor switch 50 remains closed and allows heater 71 to open switch 72 to deenergize the water inlet solenoid 56. If the load is extremely large, sensor switch 50 will continue to open and close because of an insufficient water quantity until the high level water switch 62 opens with switch 72 still being closed.

One advantage of employing a normally closed contact system of the type described is from the fact that in case of an electrical failure in the sensor switch 50 or the heater 71, the machine will continue to be filled until the high level pressure switch 62 is actuated. Thus, the failure of these devices would not prohibit a sufficient amount of water being added to the machine.

It is possible, however, to employ a normally open switch for the heater switch 72 and also for the sensor switch 50. In this case, the machine would fill until the low level pressure switch 58 moved from engagement with the contact 59 to contact 61, thus initiating the washing action. At this time, however, the water inlet solenoid 56 would be deenergized because the heater switch 72 would be open. If the minimum amount of water provided by the low level pressure switch 58 is sufficient for the load being washed, the sensor switch 50 would not close and the heater 71 would remain deenergized and no more water could be introduced into the machine. If there is not enough water present in the machine for the load being washed at this time, the sensor switch 50 will intermittently close to energize the heater 71 and after a short period of energization, the heater 71 would close the heater switch thus allowing more water to enter the machine until enough water was present for the load to allow sensor switch 50 to remain open causing the deenergization of heater 71 to allow switch 72 to reopen or until high water level switch 62 opened up.

In FIGURE 3, there is illustrated a modified form of the circuit which can be used to replace the elements contained within the dashed line of FIGURE 2. In this embodiment of the invention, the sensor switch 50 is placed in series with a first heater 71 which controls the heater switch 72. A second heater, a voltage compensator heater 74, is placed in parallel circuit relationship with the sensor switch 50 and the first heater 71. A pair of voltage dropping resistors 76 and 77 are added, if required.

The switch shown in FIGURE 3 is a commercially available device which consists essentially of two heater elements wound about a U-shaped bimetallic element. When a high ambient temperature is present, the bimetallic strip has a tendency to be pre-heated, and might therefore have a tendency to open up prematurely. To compensate for this, the freely suspended end of the bimetallic strip when subjected to this higher ambient temperature will physically rise a small amount, thus increasing the pressure of the switch contacts, making it necessary for the coil to be energized for the required amount of time to open up the switch. If a large voltage is present, the tendency is for the heater coil to open the switch sooner, but the voltage compensator coil also heats the freely suspended end of the bimetal causing it to rise and increase the pressure on the contacts, thus requiring a longer time for the first heater to open the switch. The objective of this switch is to assure consistent operation of the automatic water level control regardless of voltage and ambient variations.

The pre-setting assembly for adjusting the operating point of the sensor assembly is illustarted in FIGURES 5 through 8 of the drawings. In FIGURE 5 there is shown a sector shaped base 81 which is arranged to be secured to the tub ring 46 by means of screws 82. The base 81 has an upturned marginal portion 83 in which is provided a serrated slot 84 which accommodates sliding movement of an adjusting arm or slide 86. The slide 86 is pivotally movable with respect to the base 81 at a pin 87 which connects the slide 86 with a vertically offset portion of the base 81. Spring clip 86a provides tension to position and hold slide 86 in the serrations of slot 84.

The slide 86 also carries an annularly disposed camming slot 88 which engages a pin 89. The latter is rigidly secured to a support arm 91 which is pivotally supported as at 91a to the base 81. Support arm 91 carries a clip 92 or the like for releasably holding the mercury sensor switch 50. Thus, as the slide arm 86 is moved to the left or right the engagement of the pin 89 within the slot 88 causes the clip 92 to be moved upwardly or downwardly, as the case may be, thereby changing the amount of transmitted torque necessary to close the contacts of the conventional mercury sensor switch 50.

It should be evident that various modifications can be practiced with respect to the described subject matter without departing from the novel concepts of this invention.

The embodiments of the invention in which an exclusive property or privilege is claimed are defined as follows:

1. In a laundry machine including a tank and fluid supply means for supplying liquid to said tank, an agitator within said tank for agitating articles placed within said tank, and a torque sensing switch connected to said tank and actuated by a predetermined amount of torque transmitted through said articles to said tank by said agitator, the combination of control circuitry including an electrically energized heater in series with said torque sensing switch, and a switch responsive to the heat output of said heater and electrically controlling introduction of liquid into said tank by said fluid supply means.

2. In a laundry machine including a tank and fluid supply means for supplying liquid to said tank, an agitator within said tank for agitating articles placed within said tank, and a torque sensing switch connected to said tank and actuated by a predetermined amount of torque transmitted through said articles to said tank by said agitator, the combination of control circuitry including an electrically energized heater in series with said torque sensing switch, means including a liquid level responsive switch arranged to terminate flow of liquid into said tank, and a switch responsive to the heat output of said heater in series relationship with said liquid level responsive switch and electrically controlling the energization of said fluid supply means.

3. In a laundry machine including a tank, and fluid supply means for supplying said tank with washing fluid, an agitator within said tank for agitating articles placed within said tank, and a torque sensing switch connected to said tank and actuated by a predetermined amount of torque transmitted through said articles to said tank by said agitator, the combination of control circuitry including an electrically energized heater in series with said torque sensing switch, and a normally closed switch responsive to the heat output of said heater and electrically controlling introduction of liquid into said tank by said fluid supply means.

4. In a laundry machine including a tank, and fluid supply means for supplying said tank with washing fluid, an agitator within said tank for agitating articles placed within said tank, and a torque sensing switch connected to said tank and actuated by a predetermined amount of torque transmitted through said articles to said tank by said agitator, the combination of control circuitry including a first electrically energized heater in series with said torque sensing switch, a second heater in parallel circuit relationship to said first heater, and a switch responsive to the heat output of both of said heaters and electrically controlling the introduction of washing fluid to said tank by said fluid supply means, said second heater tending to restrain actuation of said switch upon an increase in voltage across said second heater.

5. In a laundry machine including a tank and fluid supply means for supplying said tank with washing fluid, an agitator within said tank for agitating articles placed within said tank, and a torque sensing switch connected to said tank and actuated by a predetermined amount of torque transmitted through said articles to said tank by said agitator, the combination of control circuitry including a first electrically energized heater in series with said torque sensing switch, a second heater in parallel circuit relationship to said first heater, and a normally closed switch responsive to the heat output of both of said heaters and electrically controlling introduction of washing fluid into said tank by said fluid supply means, said second heater tending to restrain opening of said switch upon an increase in voltage across said second heater.

6. A laundry machine comprising a tank, an agitator within said tank for agitating articles placed within said tank, fluid supply means for supplying liquid to said tank, a first level sensitive means having first and second positions, said first level sensitive means being electrically connected in said first position to said fluid supply means and movable into said second position upon attainment of a predetermined low level of liquid within said tank, a second level sensitive means actuated by attainment of a predetermined higher level of liquid within said tank, a torque responsive switch connected to said tank and actuated by a predetermined amount of torque transmitted through said articles to said tank by said agitator, an electrically energized heater in series with said torque responsive switch and with said first level sensitive means in its second position, and a switch responsive to the heat output of said heater and in series relationship with said second level sensitive means and electrically controlling the operation of said fluid supply means.

7. A laundry machine comprising a tank, an agitator within said tank for agitating articles placed within said tank, fluid control means for introducing liquid within said tank, a first level sensitive means having first and second positions, said first level sensitive means being electrically connected in said first position to said fluid supply means and movable into said second position upon attainment of a predetermined low level of liquid within said tank, a second level sensitive means actuated by attainment of a predetermined higher level of liquid within said tank, a normally closed torque responsive switch connected to said tank and actuated by a predetermined amount of torque transmitted through said articles to said tank by said agitator, an electrically energized heater in series with said torque responsive switch and with said first level sensitive means in its second position, and a normally closed switch responsive to the heat output of said heater and in series relationship with said second level sensitive means electrically controlling the operation of said fluid control means.

8. In a washing machine, a container and agitation means for effecting a washing operation of articles placed within said container, fluid supply means for controlling flow of washing fluid into said container, control means including torque responsive means sensitive to torque transmitted through said articles to said container by said agitation means, said control means including a switch controlling said fluid supply means and further including time delay means for operating said switch to terminate flow of washing fluid into said container in response to the torque sensed by said torque responsive means.

9. In a washing machine, a container and agitation means for effecting a washing operation of articles placed within said container, fluid supply means for supplying washing fluid to said container, control means including torque responsive means sensitive to torque transmitted through said articles to said container by said agitation means, said control means including a switch controlling said fluid supply means and further including a thermally sensitive device for operating said switch to terminate flow of washing fluid into said container in response to a predetermined degree of torque sensed by said torque responsive means.

10. In a laundry machine, a container and agitation means for effecting a washing operation of articles placed within said container, fluid supply means for supplying washing fluid to said container, torque sensing means mounted on said machine and operable by torque transmitted through said articles to said tank by said agitation means, thermal means controlled by said torque sensing means, first and second parallel circuits providing plural energization paths for said fluid supply means, the first of said circuits including a low level switch actuated by attainment of a predetermined low level of fluid within said container, the second of said circuits including a second level switch actuated by attainment of a predetermined higher level of fluid within said container, said second circuit further including a switch responsive to the heat output of said thermal means for terminating fluid flow to said container independently of the operation of said second level switch.

11. In a laundry machine including a tank and fluid supply means for supplying liquid to said tank, an agitator within said tank for agitating articles placed within said tank, and normally open torque sensing switch connected to said tank and actuated to a closed position by a predetermined amount of torque transmitted through said articles to said tank by said agitator, the combination of control circuitry including an electrically energized heater in series with said normally open torque sensing switch, and a normally open switch responsive to the heat output of said heater when said normally open torque sensing switch is in its closed position electrically controlling introduction of liquid into said tank by said fluid supply means.

12. In a washing machine provided with a fluid container and agitation means therein, an agitation solenoid controlling said agitation means, means yieldingly mounting said container to accommodate movements thereof in response to movements of said agitation means, a normally closed sensor switch spaced from said agitation means and actuated by a predetermined amount of movement of said container, a fill valve controlling the introduction of fluid to said container, a fill valve solenoid controlling energization of said fill valve, a minimum fluid level control switch having a first closed position and a second closed position and moving from said first closed position to said second closed position upon attainment of a predetermined minimum water level in said fluid container, a maximum fluid level control switch having a first closed position and a second open position and moving from said first closed position to said second open position upon attainment of a predetermined maximum fluid level in said fluid container, an electric heater, a normally closed heat accumulator switch positioned to sense the output of said electric heater, a first circuit including said minimum fluid level switch in its first position and said fill valve solenoid, a second circuit including said minimum fluid level switch in its second position and said agitation solenoid, a third circuit including said minimum fluid level switch in its second position, said electric heater and said normally closed sensor switch, a fourth circuit including said normally closed heat accumulator switch, said maximum fluid level switch in its first position and said fill valve solenoid, and said fourth circuit being deenergized by the opening of said normally closed heat accumulator switch after a predetermined heat quantity is sensed from said electric heating means by said normally closed heat accumulator switch.

13. In the washing machine as claimed in claim 12 wherein the period of time necessary for said heat accumulator switch to move from its normally closed to its open position deenergizing said fourth circuit is determined by the energization of said third circuit as controlled by the opening and closing of said normally closed sensor switch due to movements of said container.

14. In the washing machine as claimed in claim 12 wherein said fourth circuit is deenergized independently of said normally closed heat accumulator switch by the movement of said maximum fluid level control switch from its first to its second position.

References Cited in the file of this patent
UNITED STATES PATENTS

| | | |
|---|---|---|
| 1,995,318 | Merrill | Mar. 26, 1935 |
| 1,995,635 | Clark | Mar. 26, 1935 |
| 2,316,570 | Dunham | Apr. 13, 1943 |
| 2,562,772 | Clark | July 31, 1951 |
| 2,896,436 | Buechler | July 28, 1959 |
| 2,909,050 | Leach | Oct. 20, 1959 |